(12) United States Patent
Abedini et al.

(10) Patent No.: US 11,330,603 B2
(45) Date of Patent: May 10, 2022

(54) SOUNDING BASED BEAM MANAGEMENT AND REPEATER ASSOCIATION

(71) Applicant: QUALCOMM Incorporated, San Diego, CA (US)

(72) Inventors: Navid Abedini, Somerset, NJ (US); Junyi Li, Chester, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/990,689

(22) Filed: Aug. 11, 2020

(65) Prior Publication Data

US 2021/0051679 A1 Feb. 18, 2021

Related U.S. Application Data

(60) Provisional application No. 62/885,656, filed on Aug. 12, 2019.

(51) Int. Cl.
*H04W 72/08* (2009.01)
*H04W 24/10* (2009.01)
*H04W 72/04* (2009.01)
*H04B 7/155* (2006.01)

(52) U.S. Cl.
CPC ...... *H04W 72/085* (2013.01); *H04B 7/15542* (2013.01); *H04W 24/10* (2013.01); *H04W 72/044* (2013.01)

(58) Field of Classification Search
CPC . H04W 72/044; H04W 72/085; H04W 24/10; H04B 7/15542; H04B 7/15507; H04B 7/088; H04B 7/0695
See application file for complete search history.

(56) References Cited

U.S. PATENT DOCUMENTS

| | | | | |
|---|---|---|---|---|
| 10,020,869 | B1* | 7/2018 | Prock | H04B 7/15542 |
| 2010/0120397 | A1* | 5/2010 | Kazmi | H04B 7/2606 455/410 |
| 2010/0323614 | A1 | 12/2010 | Yu et al. | |
| 2011/0110261 | A1* | 5/2011 | Frenger | H04W 72/085 370/252 |
| 2014/0126516 | A1* | 5/2014 | Kato | H04W 74/0833 370/329 |
| 2019/0288767 | A1* | 9/2019 | Wang | H04J 11/0056 |
| 2021/0144716 | A1* | 5/2021 | Choi | H04W 72/042 |

OTHER PUBLICATIONS

International Search Report and Written Opinion—PCT/US2020/045948—ISA/EPO—dated Dec. 7, 2020.
Partial International Search Report—PCT/US2020/045948—ISA/EPO—dated Oct. 16, 2020.

* cited by examiner

*Primary Examiner* — Siu M Lee
(74) *Attorney, Agent, or Firm* — Patterson + Sheridan, LLP

(57) ABSTRACT

Aspects of the present disclosure provide apparatus, methods, processing systems, and computer readable mediums to enhance the functionality of directional repeaters (wireless nodes that relay directional wireless signals). For example, by adding even limited capability to buffer digital samples, repeater functionality may be enhanced to provide better coverage and make more efficient use of time, frequency, and spatial resources.

31 Claims, 14 Drawing Sheets

US 11,330,603 B2

SOUNDING BASED BEAM MANAGEMENT AND REPEATER ASSOCIATION

CROSS REFERENCE TO RELATED APPLICATION

This application hereby claims priority under 35 U.S.C. § 119 to U.S. Provisional Patent Application No. 62/885,656, filed on Aug. 12, 2019, the contents of which are incorporated herein in their entirety.

BACKGROUND

Field of the Disclosure

Aspects of the present disclosure relate to wireless communications, and more particularly, to techniques for utilizing devices capable of repeating directional wireless transmissions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless nodes to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communication in integrated access and backhaul systems.

Certain aspects provide a method for wireless communications by a first wireless node. The method generally includes using one or more beams to communicate RF signals between at least one base station and at least one second wireless node, and participating in at least one sounding procedure with the second wireless node.

Certain aspects provide a method for wireless communication by a third wireless node. The method generally includes configuring a first wireless node for using one or more beams to communicate RF signals between the third wireless node and at least one second wireless node, configuring the first wireless node to in at least one sounding procedure with the second wireless node, and receiving a report, from at least one of the first wireless node or second wireless node, indicating a result of the sounding procedure.

Certain aspects provide a method for wireless communications by a second wireless node. The method generally includes receiving, from a base station, a configuration for participating in at least one sounding procedure with a first wireless node configured to communicate RF signals between the base station and the second wireless node and participating in the at least one sounding procedure with the first wireless node in accordance with the configuration.

To the accomplishment of the foregoing and related ends, the one or more aspects including the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
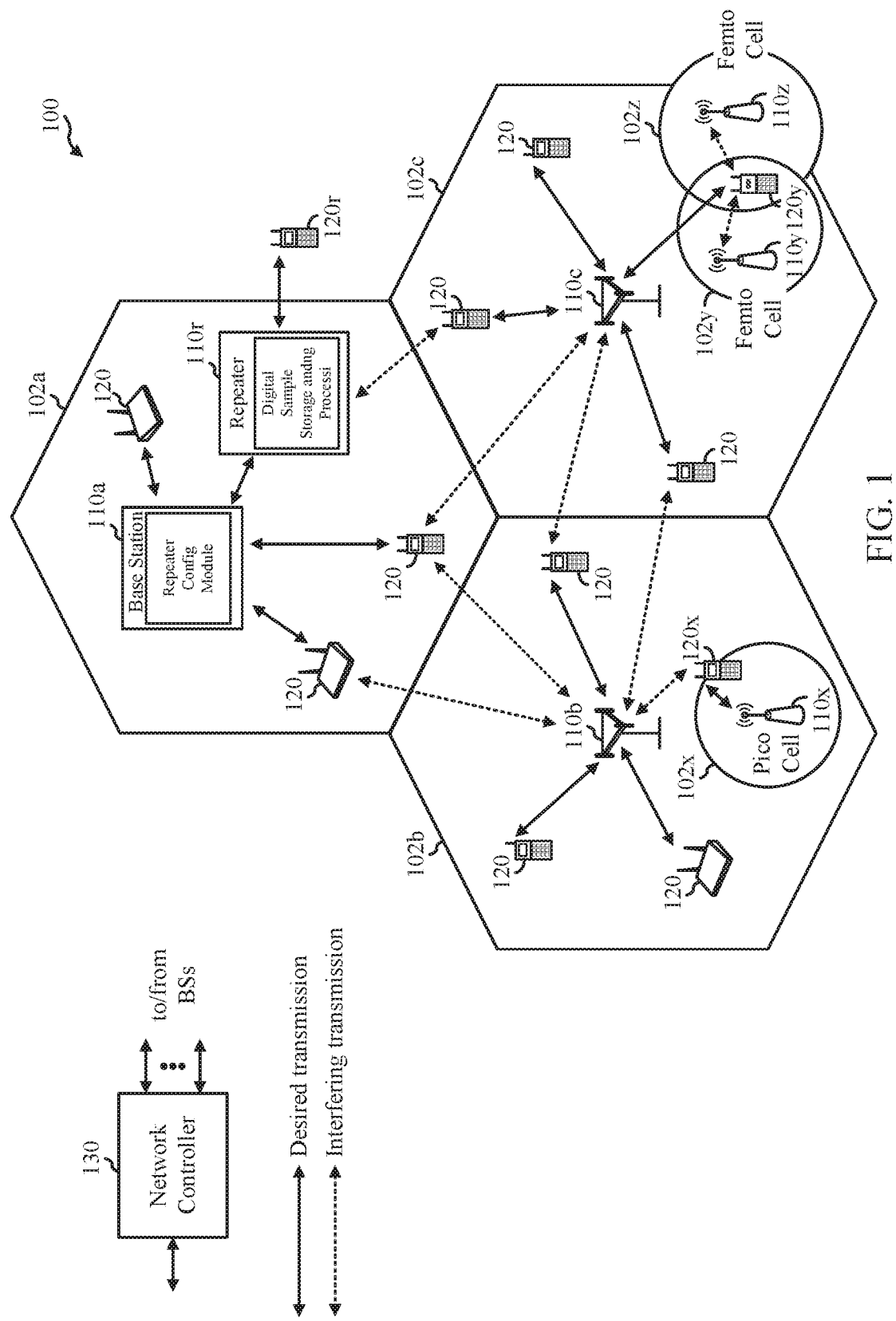
FIG. 1 is a block diagram conceptually illustrating an example wireless system, in accordance with certain aspects of the present disclosure.

Aspects of the present disclosure provide apparatus, methods, processing systems, and computer readable mediums to enhance the functionality of directional repeaters (wireless nodes that relay directional wireless signals). As described in greater detail below, directional repeaters may be configured to participate in (UL-centric and/or DL-centric) sounding procedures, such as SRS-based beam management and association procedures. Information gathered by these procedures (locally by the SRS and/or UE) may allow the selection and use of directional repeaters to be fine-tuned to provide better coverage and make more efficient use of time, frequency, and spatial resources.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), an IAB node (e.g., an IAB donor node, an IAB parent node, and an IAB child node), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem (such as an AR/VR console and headset). Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communications System

FIG. 1 illustrates an example wireless communication network 100 in which aspects of the present disclosure may be performed. For example, as shown in FIG. 1, a base station 110a may include a repeater configuration module, designed to configure a repeater 110r to store and process digital samples of analog RF signals (rather than simply retransmit the received analog signal to another wireless device). The RF signals may include downlink RF signals from a base station to another wireless device (e.g., a user equipment or another repeater), as well as uplink RF signals from another wireless device to a base station.

The wireless communication network 100 may, for example, be a New Radio or 5G network. As illustrated in FIG. 1, the wireless communication network 100 may include a number of access points (APs) 110 and other network entities. An AP may be a station that communicates with user equipment (UEs). Each AP 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR AP, 5G NB, or transmission reception point (TRP) may be interchangeable. In some examples, a cell may not necessarily be stationary, and the geographic area of the cell may move according to the location of a mobile AP. In some examples, the access points may be interconnected to one another and/or to one or more other access points or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

An AP may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). An AP for a macro cell may be referred to as a macro AP. An AP for a pico cell may be referred to as a pico AP. An AP for a femto cell may be referred to as a femto AP or a home AP. In the example shown in FIG. 1, the APs 110a, 110b and 110c may be macro APs for the macro cells 102a, 102b and 102c, respectively. The AP 110x may be a pico AP for a pico cell 102x. The APs 110y and 110z may be femto APs for the femto cells 102y and 102z, respectively. An AP may support one or multiple (e.g., three) cells.

Wireless communication network 100 may also include relay stations. A relay station is a station that receives a transmission of data and/or other information from an upstream station (e.g., an AP or a UE) and sends a transmission of the data and/or other information to a downstream station (e.g., a UE or an AP). A relay station may also be a UE that relays transmissions for other UEs. In the example shown in FIG. 1, a relay station 110r may communicate with the AP 110a and a UE 120r in order to facilitate communication between the AP 110a and the UE 120r. A relay station may also be referred to as an IAB node, a relay AP, a relay, etc.

Wireless communication network 100 may be a heterogeneous network that includes APs of different types, e.g., macro AP, pico AP, femto AP, relays, etc. These different types of APs may have different transmit power levels, different coverage areas, and different impact on interference in the wireless communication network 100. For example, macro AP may have a high transmit power level (e.g., 20 Watts) whereas pico AP, femto AP, and relays may have a lower transmit power level (e.g., 1 Watt).

Wireless communication network 100 may support synchronous or asynchronous operation. For synchronous operation, the APs may have similar frame timing, and transmissions from different APs may be approximately aligned in time. For asynchronous operation, the APs may have different frame timing, and transmissions from different APs may not be aligned in time. The techniques described herein may be used for both synchronous and asynchronous operation.

A network controller 130 may couple to a set of APs and provide coordination and control for these APs. The network controller 130 may communicate with the APs 110 via a backhaul. The APs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with an AP, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., an AP) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Access points are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving AP, which is an AP designated to serve the UE on the downlink and/or uplink. A finely dashed line with double arrows indicates interfering transmissions between a UE and an AP.

Figure 2:
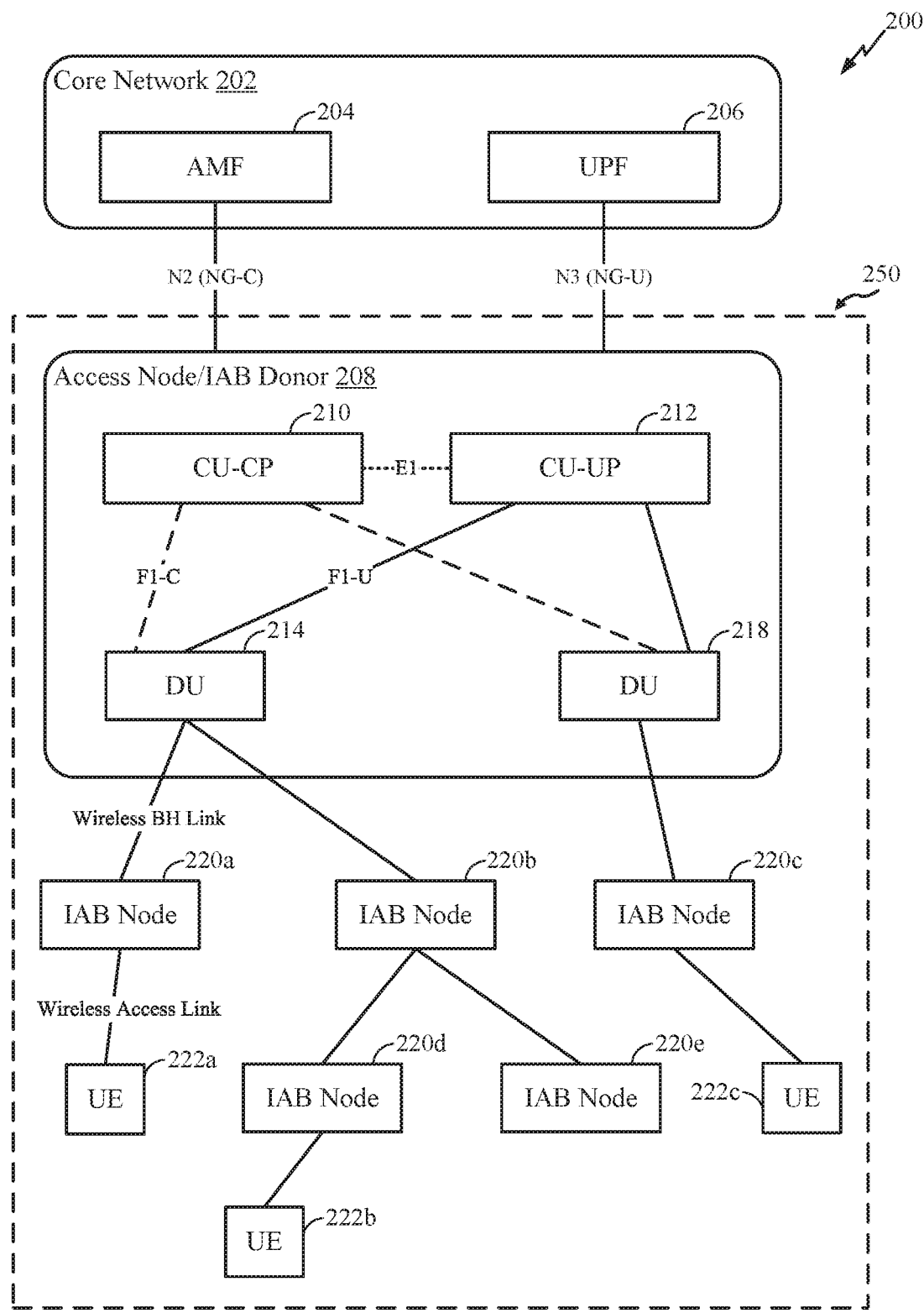
FIG. 2 is a block diagram conceptually illustrating an example architecture of a distributed radio access network (RAN), in accordance with certain aspects of the present disclosure.

FIG. 2 illustrates an example architecture of a distributed radio access network (RAN) 200 that includes an example IAB network 250, which may be implemented in the wireless communication network 100 illustrated in FIG. 1. As shown in FIG. 2, the distributed RAN includes core network (CN) 202 and access node (AN) configured as an IAB donor 208.

As shown, the IAB network 250 includes an IAB donor node 208. The IAB donor node 208 is a RAN node (e.g., access point/gNB that terminates the NR Ng interface with the core network (e.g., next generation NG core)) and is generally connected to the core network via a wireline backhaul link. The CN 202 may host core network functions. CN 202 may be centrally deployed. CN 202 functionality may be offloaded (e.g., to advanced wireless services (AWS)), in an effort to handle peak capacity. The CN 202 may include the access and mobility management function (AMF) 204 and user plane function (UPF) 206. The AMF 204 and UPF 206 may perform one or more of the core network functions.

The IAB donor 208 may communicate with the CN 202 (e.g., via a backhaul interface). The IAB donor 208 may communicate with the AMF 204 via an N2 (e.g., NG-C) interface. The IAB donor 208 may communicate with the UPF 206 via an N3 (e.g., NG-U) interface. The IAB donor 208 may include a central unit-control plane (CU-CP) 210, one or more central unit-user plane (CU-UPs) 212, one or more distributed units (DUs) 214-218, and one or more antenna/remote radio units (AU/RRUs) (not shown). The CUs and DUs may also be referred to as gNB-CU and gNB-DU, respectively.

An IAB donor node 208 may also be referred to as an IAB anchor node and may include an IAB central unit (e.g., NR CU) or an IAB Distributed Unit (e.g., NR DU). The IAB network 250 further includes one or more non-donor IAB nodes (e.g., 220a-220e). Each IAB node (including donor and non-donor IAB nodes) may serve one or more UEs (e.g., 222a-222c) connected to an IAB node. As shown, the IAB nodes, including the donor IAB node 208, may be connected via wireless backhaul links (e.g., NR wireless backhaul links or backup NR wireless backhaul links). Each IAB node connects to its served UEs via respective access links.

Each IAB node is a RAN node (e.g., access point/gNB) that provides IAB functionality with two roles including data unit function (DU-F) and a mobile termination function (MT-F). The DU-F of an IAB node is generally responsible for scheduling UEs (e.g., served by the IAB node) and other IAB nodes (e.g., that are connected as child nodes to the IAB node). The DU-F also controls both access and backhaul links under its coverage. The MT-F of an IAB node is controlled and scheduled by an IAB donor node or another IAB node as its parent IAB node. In an aspect, the IAB donor node 208 only includes DU-F and no MT-F.

The CU-CP 210 may be connected to one or more of the DUs 214-218. The CU-CP 210 and DUs 214-218 may be connected via a wireline interface using F1-C protocols. As shown in FIG. 2, the CU-CP 210 may be connected to multiple DUs, but the DUs may be connected to only one CU-CP. Although FIG. 2 only illustrates one CU-UP 212, the IAB donor 208 may include multiple CU-UPs. The CU-CP 210 selects the appropriate CU-UP(s) for requested services (e.g., for a UE). The CU-UP(s) 212 may be connected to the CU-CP 210. For example, the CU-UP(s) 212 and the CU-CP 210 may be connected via an E1 interface. The CU-CP(s) 212 may be connected to one or more of the DUs 214, 218. The CU-UP(s) 212 and DUs 214, 218 may be connected via a F1-U interface. As shown in FIG. 2, the CU-CP 210 may be connected to multiple CU-UPs, but the CU-UPs may be connected to only one CU-CP.

A DU, such as DUs 214 and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214, 218 may be connected with one of AU/RRUs.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, IAB donor 208 may support dual connectivity with NR and may share a common fronthaul for LTE and NR. The distributed RAN 200 may enable cooperation between and among DUs 214, 218, for example, via the CU-CP 212. An inter-DU interface may not be used.

Logical functions may be dynamically distributed in the distributed RAN 200. As will be described in more detail with reference to FIG. 4, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
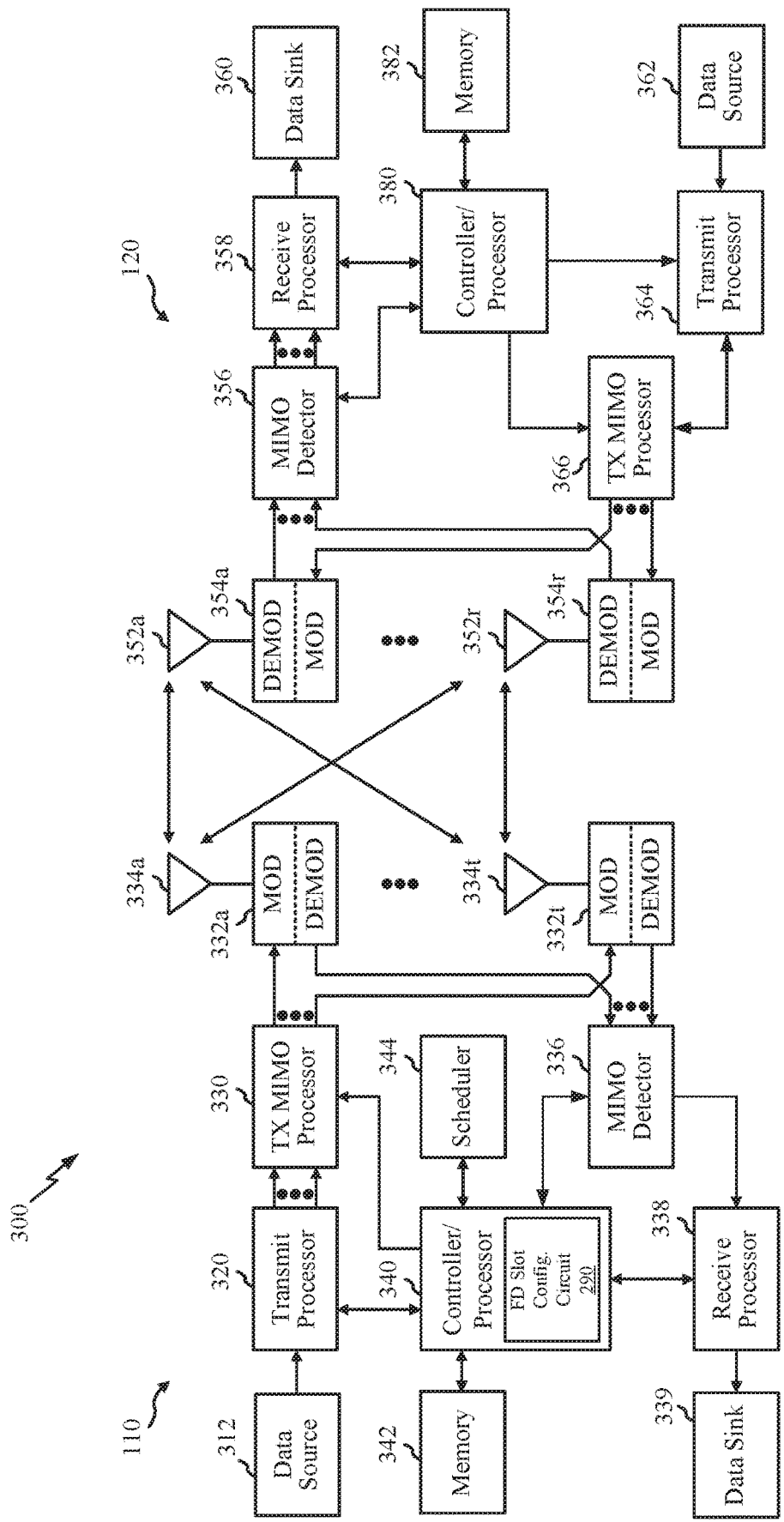
FIG. 3 illustrates example components of a base station and a user equipment, in accordance with certain aspects of the present disclosure.

FIG. 3 illustrates example components 300 of AP 110 and UE 120 (as depicted in FIG. 1), which may be used to implement aspects of the present disclosure. For example, antennas 352, processors 366, 358, 364, and/or controller/processor 380 of the UE 120 and/or antennas 334, processors 320, 330, 338, and/or controller/processor 340 of the AP 110 may be used to perform the various techniques and methods described herein. For example, as shown in FIG. 3, the processor 340 includes an full-duplex (FD) slot configuration circuit 290 that may be configured for full-duplex slot configuration in integrated access and backhaul (IAB) communication systems, according to aspects described herein. In certain aspects, the full-duplex slot communication circuit 290 enables the processor 340 to detect a change in the one or more traffic parameters, and dynamically modify a slot pattern based on the change in the one or more traffic parameters. In certain aspects, the AP 110 may be an IAB donor and/or parent node, or an IAB child node.

At the AP 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the access point 110 and may provide received signals to the demodulators (DEMODs) in transceivers 354a through 354r, respectively. Each demodulator 354 may condition (e.g., filter, amplify, downconvert, and digitize) a respective received signal to obtain input samples. Each demodulator may further process the input samples (e.g., for OFDM, etc.) to obtain received symbols. A MIMO detector 356 may obtain received symbols from all the demodulators in transceivers 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at UE 120, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a through 354r (e.g., for SC-FDM, etc.), and transmitted to the access point 110. At the AP 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the AP 110 and the UE 120, respectively. The processor 340 and/or other processors and modules at the AP 110 may perform or direct the execution of processes for the techniques described herein. The memories 342 and 382 may store data and program codes for AP 110 and UE 120, respectively. A scheduler 344 may schedule UEs for data transmission on the downlink and/or uplink.

Figure 4:
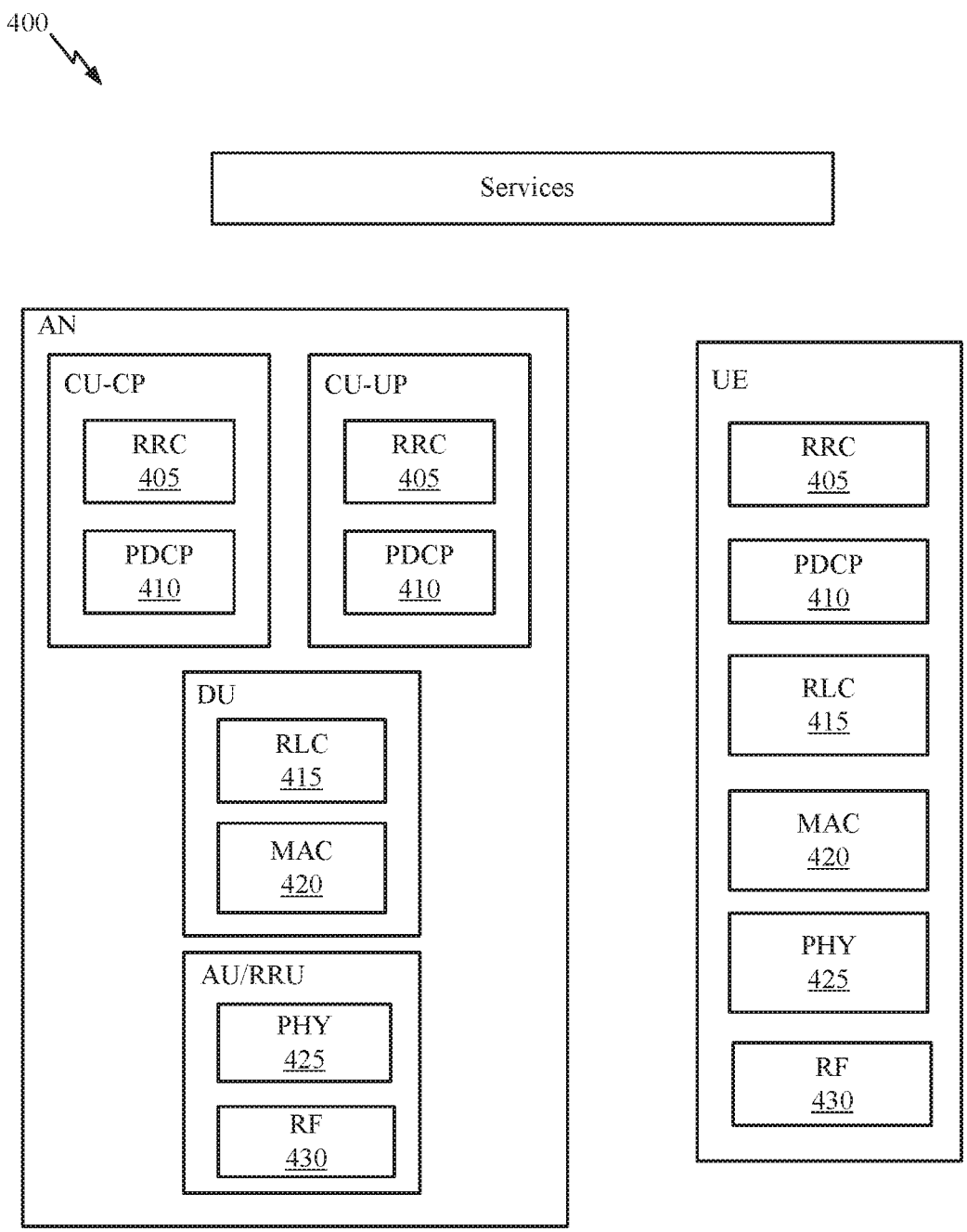
FIG. 4 is a block diagram illustrating an example communications protocol stack in a RAN, in accordance with certain aspects of the present disclosure.

FIG. 4 illustrates a diagram showing examples for implementing a communications protocol stack 400 in a RAN (e.g., such as the RAN 200), according to aspects of the present disclosure. The illustrated communications protocol stack 400 may be implemented by devices operating in a wireless communication system, such as a 5G NR system (e.g., the wireless communication network 100). In various examples, the layers of the protocol stack 400 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 4, the system may support various services over one or more protocols. One or more protocol layers of the protocol stack 400 may be implemented by an (e.g., AN 208 in FIG. 2, or AP 110a in FIG. 1) and/or the UE (e.g., UE 120).

As shown in FIG. 4, the protocol stack 400 is split in the AN. The RRC layer 405, PDCP layer 410, RLC layer 415, MAC layer 420, PHY layer 425, and RF layer 430 may be implemented by the AN. For example, the CU-CP (e.g., CU-CP 210 in FIG. 2) and the CU-UP e.g., CU-UP 212 in FIG. 2) each may implement the RRC layer 405 and the PDCP layer 410. A DU (e.g., DUs 214 and 218 in FIG. 2) may implement the RLC layer 415 and the MAC layer 420. However, the DU may also implement the PHY layer(s) 425 and the RF layer(s) 430 via an AU/RRU connected to the DU. The PHY layers 425 may include a high PHY layer and a low PHY layer.

The UE (e.g., UE 222a-222c) may implement the entire protocol stack 400 (e.g., the RRC layer 405, the PDCP layer 410, the RLC layer 415, the MAC layer 420, the PHY layer(s) 425, and the RF layer(s) 430).

Figure 5:
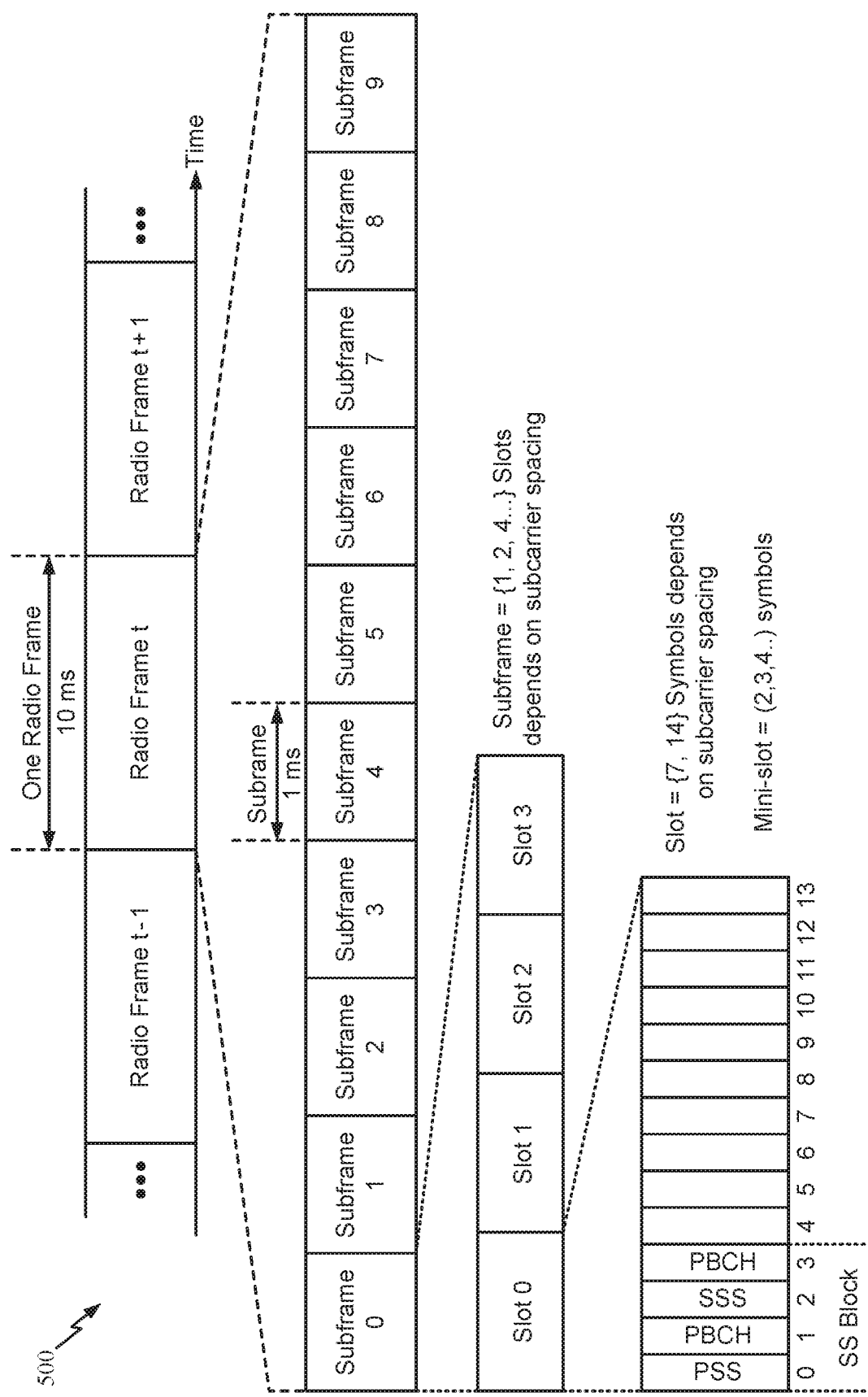
FIG. 5 is a block diagram is a diagram illustrating an example of a frame format for new radio (NR), in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or AP), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Directional Repeater

Next generation (5G) wireless networks have stated objectives to provide ultra-high data rate and support wide scope of application scenarios. Integrated access and backhaul (IAB) systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul links.

There are various possible architectures for IAB-nodes, including layer-2 (L2) and layer-3 (L3) solutions and a particular architecture deployed may depend on what layers of protocol stack are implemented in the intermediate nodes (IAB-nodes), for example, L2 relays may implement PHY/MAC/RLC layers.

Certain aspects of the present disclosure relate to L1 relays (referred to as repeaters). L1 relays/repeaters have many attractive features. For example, such repeaters are relatively simple, low-cost, low-power, and are wirelessly connected to a donor or another relay (e.g., a gNB).

Figure 6:
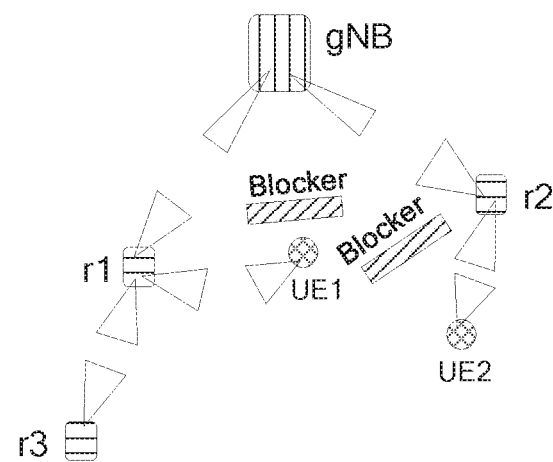
FIG. 6 is a block diagram of an example wireless system deploying repeaters, in which aspects of the present disclosure may be implemented.

FIG. 6 illustrates one example application of how repeaters may be used to help improve coverage by overcoming blockage (the obstruction of RF signals by an object). It is generally understood that blockage is a major issue in MMW (high frequencies) where beamforming is used to send directional signals. In the illustrated example, repeaters (r1, r2, and r3) may allow a gNB to serve UEs (UE1 and UE2) even though objects prevent gNB directional RF signals from reaching the UEs.

As illustrated, because r1 is not blocked, it may receive RF signals from gNB and re-transmit them to reach UE1 (although UE1 is blocked from receiving signals from gNB directly). Similarly, because r2 is not blocked, it may receive RF signals from gNB and re-transmit them to reach UE2 (although UE2 is blocked from receiving signals from gNB directly). As demonstrated by this relatively simple example, L1 repeaters may serve as relatively simple and inexpensive solutions to provide protection against blockage, extend the coverage of a MMW cell, and fill coverage holes.

Figure 7A:
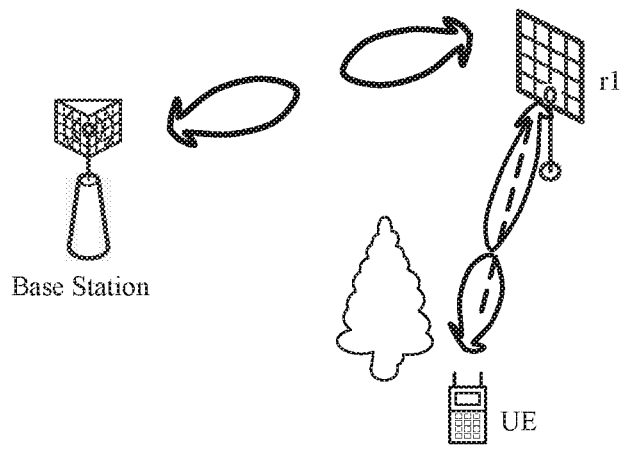
FIGS. 7A and 7B illustrate an example scenario, in which aspects of the present disclosure may be implemented.
Figure 7B:
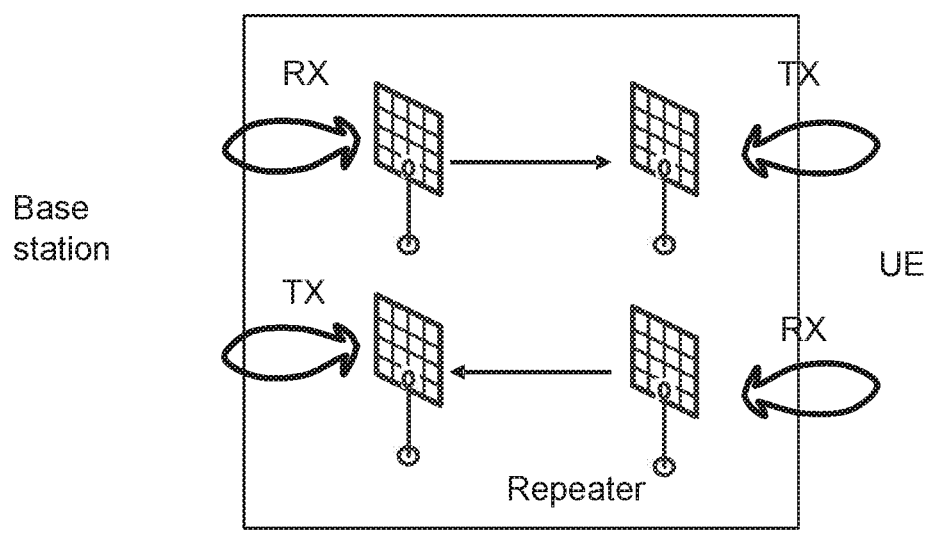

FIGS. 7A and 7B provide additional details of how repeaters may help effectively overcome the challenge of blockage. As illustrated in FIG. 7A, a traditional repeater receives an RF signal in one panel (corresponding to a receive or Rx Beam) and (re-)transmits the signal in another panel (corresponding to a transmit or Tx Beam). For example, the repeater simply amplifies the received signal and forwards it to become the transmitted signal (Amplify-and-forward).

In the example illustrated in FIG. 7A, a repeater r1 is able to receive an RF (downlink) signal from a base station and relay that RF signal to a UE that is blocked from receiving the RF signal directly from the base station directly. In the other (uplink) direction, the repeater r1 may receive an RF signal from the UE and relay that RF signal to the base station. As illustrated in FIG. 7B, receive and transmit panels may be used to implement some fixed beam patterns.

For wide coverage, the beam patterns are usually wide, therefore not achieving high array gains. The repeater is typically not aware of whether the signal is downlink or uplink in a TDD system and operates in both directions (full duplex) simultaneously.

Figure 8:
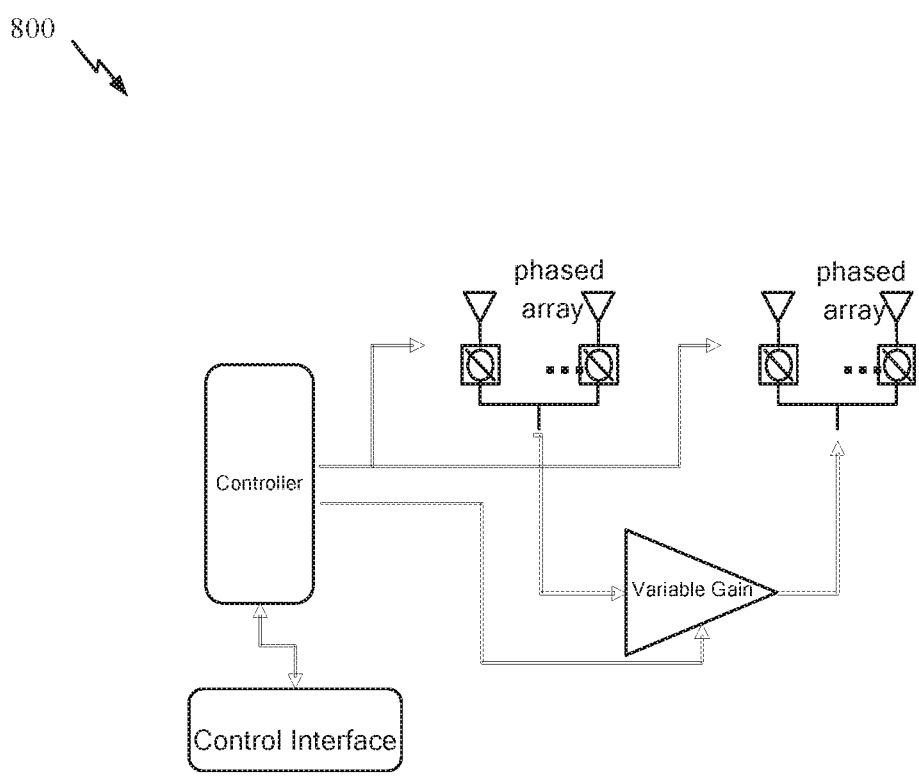
FIG. 8 is a block diagram of an example architecture for a directional repeater.

FIG. 8A illustrates a schematic view of an example architecture 800A for a repeater (e.g., an L1 repeater). As noted above, this type of repeater generally performs basic operations of receiving an analog RF signal on its RX antennas (e.g., based on some configured RX beamforming), amplifying the power of the received analog RF signal, and transmitting the amplified signal from its TX antennas (e.g., based on some configured TX beamforming).

As illustrated, the beamforming may be accomplished via phased antenna arrays configured by a controller, while the amplification may be accomplished by a variable gain amplifier. The repeater may also communicate some control signals with a server (e.g., a base station serving as a donor, control node, etc.) via a control interface. The control interface may be implemented out-of-band (operating outside the carrier frequency on which the Rx signal is received) or in-band (e.g., using a smaller bandwidth part of the same carrier frequency). An out-of-band control interface may be implemented, for example, via a separate (e.g. low-frequency) modem using a different radio technology (like BT) or different frequency (LTE NB-IoT).

Example SRS-Based Beam Management and Repeater Association

Aspects of the present disclosure may enhance the functionality of directional repeaters. In some cases, directional repeaters may be configured to participate in sounding procedures, such as SRS-based beam management and association procedures. Such procedures may allow the selection and use of directional repeaters to be fine-tuned to provide better coverage and make more efficient use of time, frequency, and spatial resources.

As noted above, in a conventional (baseline) repeater architecture, the data-path may be completely analog. In other words, the repeater does not further process the analog (to be relayed) RF signal, rather the signal is forwarded in its analog form (without any digital baseband processing).

While this approach has an advantage, in that there is no need for additional baseband processing components (ADC/DAC, etc.), there are also limitations. For example, as the received signal needs to be forwarded immediately, they cannot be digitized and buffered. Another limitation is that the repeater has to operate in full-duplex mode. For example, while receiving the RF signal over its backhaul (BH) link, the repeater needs to forward it over its access link (or vice-versa).

Further, although the use of simple repeaters may serve increase the spatial coverage region (and potentially number of UEs to be served), there is no spatial multiplexing gain in terms of processing/computations. In other words, the intermediate relay (repeater) nodes do minimal processing, which means basically all processing is to be done at the base station (gNB).

Aspects of the present disclosure, however, add capability to a repeater that may allow for enhanced utilization. Examples of this added capability include the ability to generate Sounding Reference Signals (SRS) and to measure SRS. SRS generally refers to a reference signal transmitted in the uplink direction (conventionally by a UE) which is used by a base station to estimate the uplink channel quality.

While a simple repeater would only be able to receive, amplitude, and forward SRS from a UE, the ability to generate SRS and/or measure SRS allows a repeater to participate in SRS-based procedures used for purposes such as association, repeater selection, and beam management (e.g., allowing refinement of repeater transmit and/or receive beams).

With multiple repeaters associated with a serving gNB (either over single-hop, or multi-hop), it becomes increasingly difficult to track the UE measurements and associations. In other words, it becomes difficult to find the best candidates of beams and repeaters for a UE to measure and get service from.

In a conventional approach, a gNB sends one or multiple downlink reference signals (DLRS), such as SSB or CSI-RS, to be forwarded by one or multiple repeaters (possibly over multi-hop), and a UE is instructed to do measurement and reporting. The UE may also be instructed to send one or multiple uplink reference signals (ULRS), such as SRS, to be forwarded by one or multiple repeaters, and the gNB does the UL measurements.

Aspects of the present disclosure, however, propose an alternative approach where the gNB is less directly involved. Rather than forwarding a RS (UL or DL) over potentially multiple hops, beam management can be done locally (per single hop) and based on SRS.

Given a repeater has the capability of measuring received power, a gNB can ask a UE to send an UL signal (e.g., SRS), and can ask repeater(s) to perform measurement and reporting (over the control interface). As described herein, a gNB may instruct one or several repeaters to participate in SRS-based sounding procedures. Based on the submitted reports, a gNB can figure out the best beam and repeater candidates.

Figure 9:
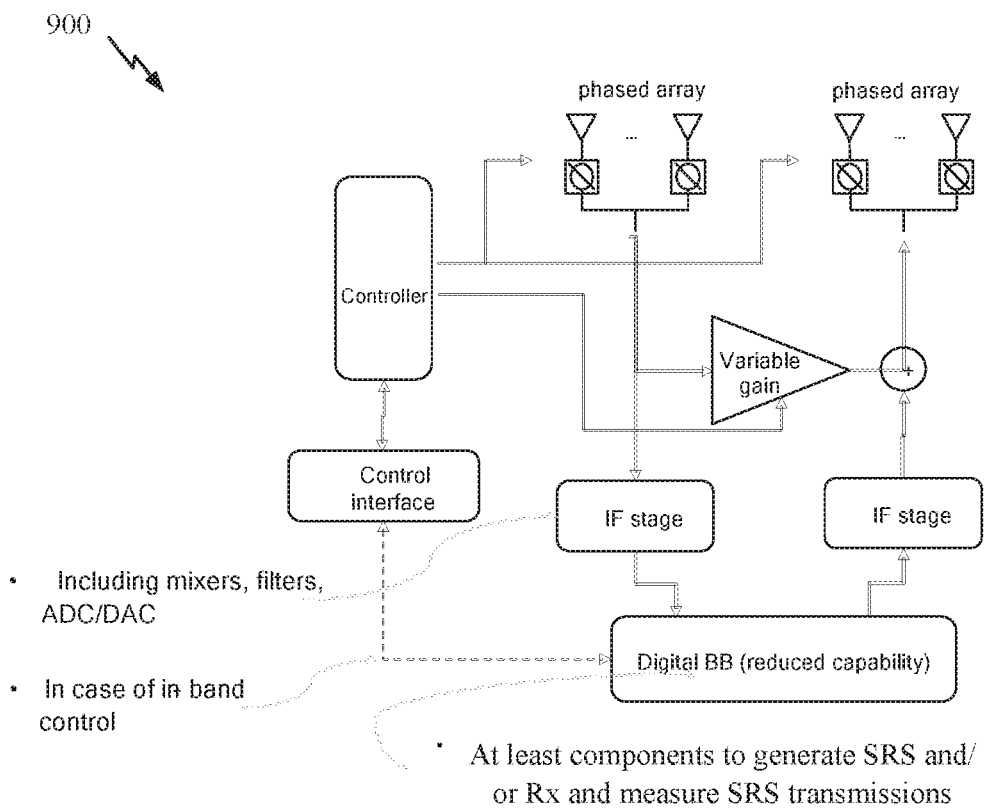
FIG. 9 is a block diagram of an example architecture for an enhanced directional repeater, in accordance with certain aspects of the present disclosure.

FIG. 9 shows an example architecture 900 with components that may add the additional capability for a repeater to assist in sounding procedures as proposed herein. As illustrated, the enhanced repeater may have additional components when compared to the base architecture of FIG. 8, which may allow the enhanced repeater to generate and send its own SRS transmissions and/or monitor for SRS transmissions (from a UE).

For example, the enhanced repeater of FIG. 9 may have components that allow the enhanced repeater to at least limited baseband processing (with at least limited baseband capability, for example, relative to a UE or gNB). The components may also include intermediate frequency (IF) stages (including mixers, filters, ADCs, DACs, and the like) designed to convert a received RF signal to an IF signal, take and store digital (IQ) samples, and generate an RF signal from the stored digital samples. For this, the enhanced repeater may include at least sufficient storage to implement a buffer to store IQ samples.

The enhanced repeater of FIG. 9 may also include a control interface to receive control signaling form a base station (e.g., to indicate how to store and process digital samples). As described above, the control signaling may be in-band or out-of-band. In the case of in-band control, the digital baseband processor may be used to extract control signaling from a received RF signal.

A repeater with in-band control, such as that shown in FIG. 9, can be capable of performing typical procedures a UE would perform (but possibly limited to a narrow bandwidth part-BWP). For example, the repeater may be capable of sending SRS in the configured BWP. The repeater may also be capable of measuring SRS in the configured BWP.

As described herein, this capability of the repeater to transmit and/or receive SRS can be used to configure the repeater to participate in SRS-based sounding procedures, for example, and use the results for BM and association purposes. Repeater participation in sounding procedures may generally be categorized as uplink centric (UL-centric) or downlink centric (DL-centric). For UL-centric sounding participation, a UE sends SRS, while a repeater (or repeaters) perform measurement and reporting. For DL-centric sounding participation, the repeater (or repeaters) send SRS, while the UE performs measurement and reporting.

Figure 10:
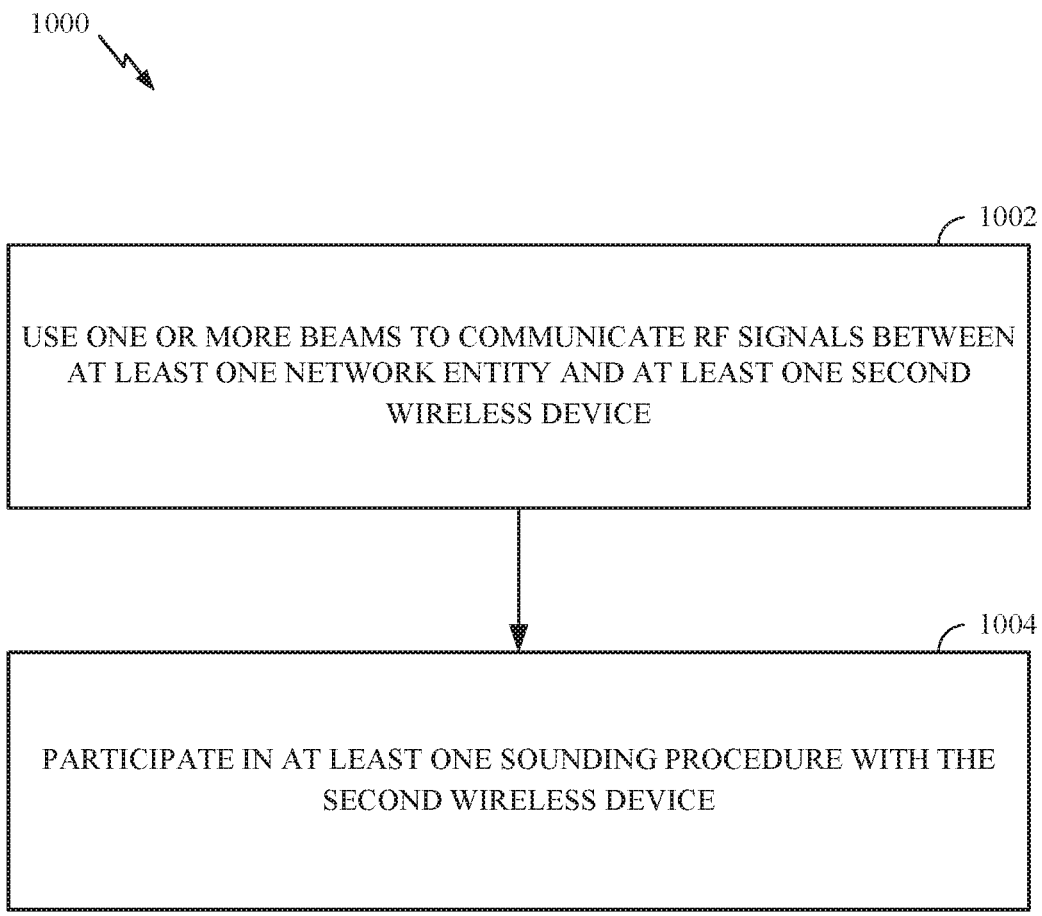
FIG. 10 illustrates example operations that may be performed by a first wireless node (e.g., a directional repeater), in accordance with certain aspects of the present disclosure.
Figure 11:
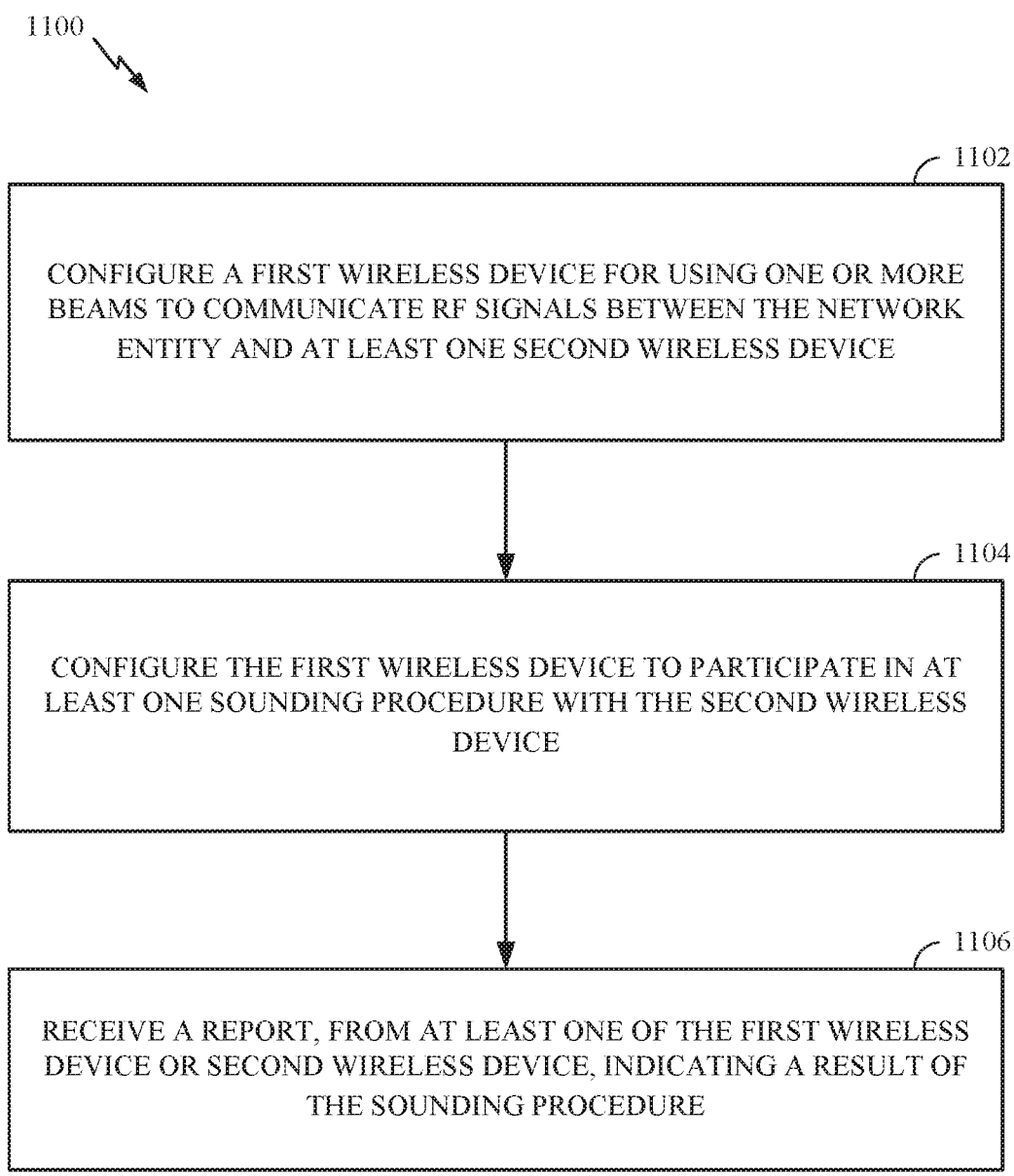
FIG. 11 illustrates example operations that may be performed by a third wireless node (e.g., a gNB), in accordance with certain aspects of the present disclosure.
Figure 12:
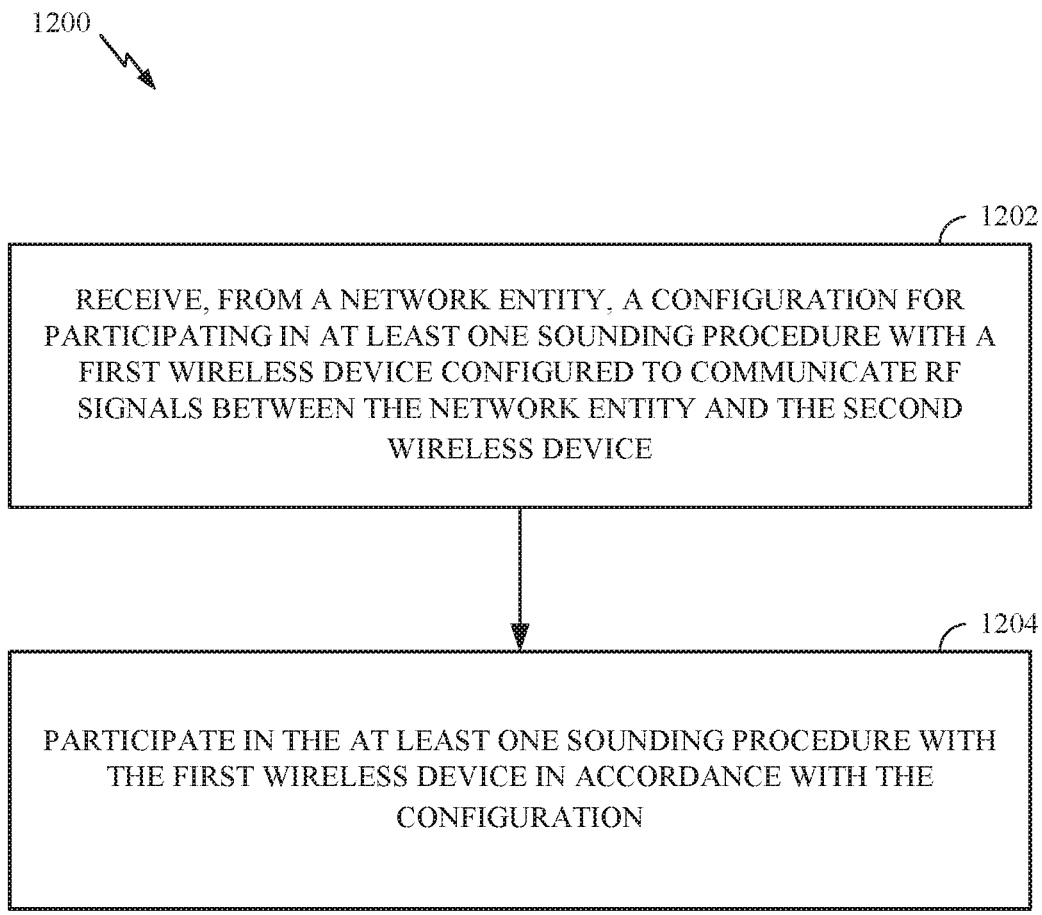
FIG. 12 illustrates example operations that may be performed by a second wireless node (e.g., a UE), in accordance with certain aspects of the present disclosure.

FIGS. 10, 11, and 12 illustrate example operations for SRS-based sounding procedures involving a repeater, from a repeater perspective, a third wireless node (e.g., gNB) perspective, and the perspective of a UE (or other type of wireless device such as another repeater in a multi-hop scenario).

FIG. 10 illustrates example operations 1000 for wireless communication by a first wireless node, in accordance with certain aspects of the present disclosure. The operations 1000 may be performed for example, by a repeater (e.g., any of the repeaters shown in FIG. 1, 6, 7, 12, or 13).

Operations 1000 begin, at 1002, by using one or more beams to communicate RF signals between at least one third wireless node and at least one second wireless node. At 1004, the repeater participates in at least one sounding procedure with the second wireless node.

FIG. 11 illustrates example operations 1100 for wireless communication by a third wireless node, in accordance with certain aspects of the present disclosure. The operations 1100 may be performed, for example, by a base station (e.g., any of the base stations/gNBs shown in FIG. 1, 2, 6, 7, 12, or 13) to configure an enhanced repeater performing operations 1000.

Operations 1100 begin, at 1102, by configuring a first wireless node for using one or more beams to communicate RF signals between the third wireless node and at least one second wireless node. At 1104, the third wireless node configures the first wireless node to in at least one sounding procedure with the second wireless node. At 1106, the base station receives a report, from at least one of the first wireless node or second wireless node, indicating a result of the sounding procedure.

Alternatively, a first wireless node can configure a second wireless node to communicate wireless signals between a third wireless node and a fourth wireless node and also configure the second wireless node to participate in at least one sounding procedure with at least one of the third wireless node or the fourth wireless node. Thereafter, the first wireless node receives a report, from at least one of the second wireless node, third wireless node or fourth wireless device, indicating a result of the sounding procedure. In one aspect, the first wireless node can be a gNB, the second wireless node can be a repeater and each of the third and fourth wireless nodes can be a UE. In another aspect, the first wireless node and the third wireless node are the same wireless node. Furthermore, each of the first, second, third and fourth wireless nodes can be one of a gNB, a repeater or a UE.

FIG. 12 illustrates example operations 1200 for wireless communication by a second wireless node, in accordance with certain aspects of the present disclosure. The operations 1200 may be performed for example, by a UE (e.g., any of the UEs shown in FIG. 1, 2, 6, 7, 12, or 13).

Operations 1200 begin, at 1202, by receiving, from a third wireless node, a configuration for participating in at least one sounding procedure with a first wireless node configured to communicate RF signals between the third wireless node and the second wireless node. At 1204, the repeater participates in the at least one sounding procedure with the first wireless node in accordance with the configuration.

Figure 13:
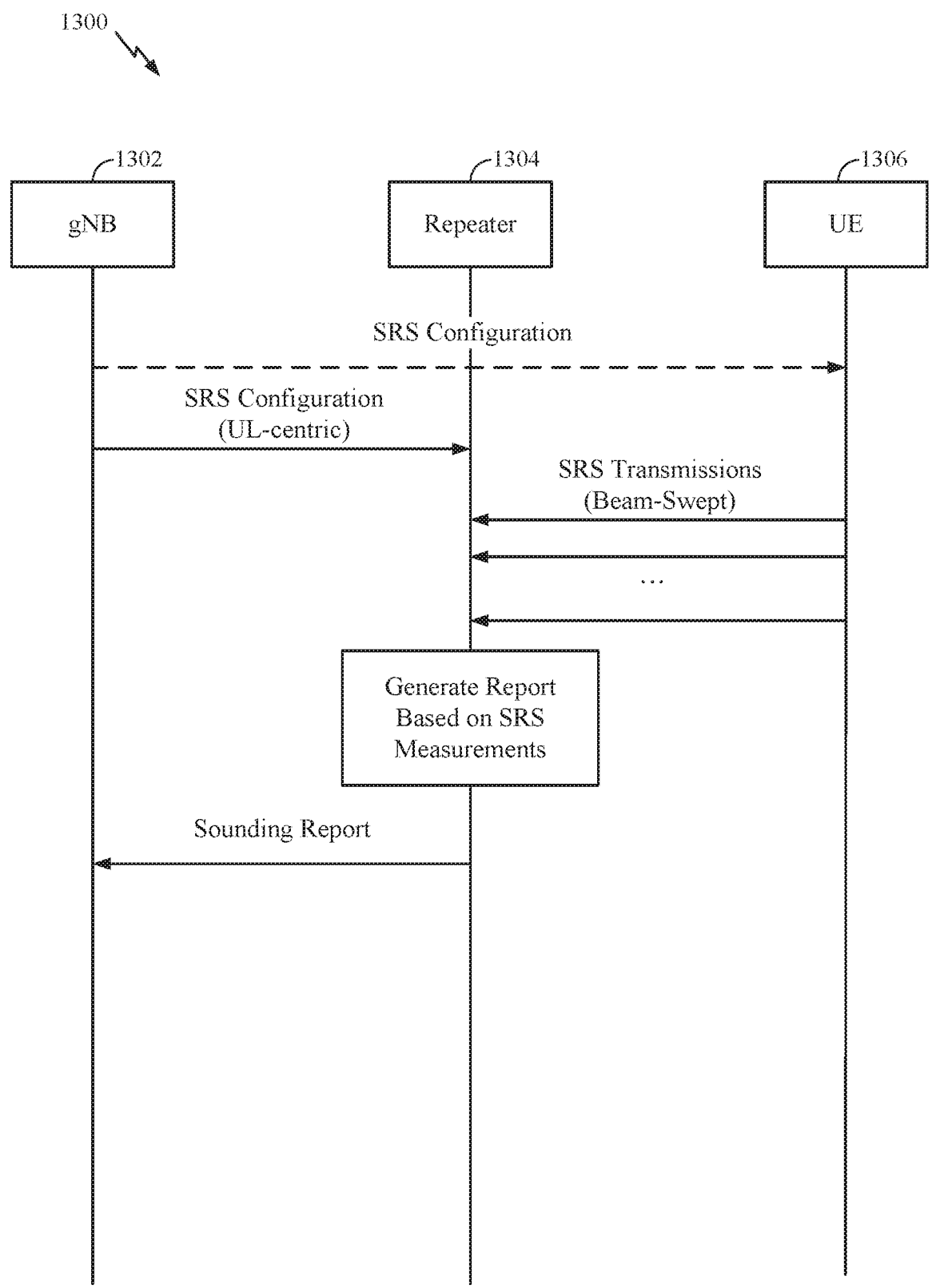
FIG. 13 is a call flow diagram illustrating example repeater configuration and operation for participation in an UL-centric sounding procedure, in accordance with certain aspects of the present disclosure.

FIG. 13 is a call flow diagram for an example UL-centric sounding procedure, in accordance with aspects of the present disclosure. As noted above, for UL-centric sounding participation, a UE sends SRS, while a repeater (or repeaters) perform measurement and reporting.

To participate in the sounding procedure, a UE may get connected to the network by following the typical access procedure. The UE may be further instructed to perform downlink measurements and report (e.g., based on SSB/CSI-RS).

As illustrated in FIG. 13, the UE may also be provided with an SRS configuration and accordingly sends SRS. The UE may be configured to transmit the SRS periodically, aperiodically, or in an event-triggered manner. In some cases, the UE may be provided with spatial relationship information (e.g., indicating what beam(s) to use for transmitting SRS. This information may indication SRS is considered quasi co-located (QCL'ed) with some measured SSBs/CSI-RS. Thus, based on reported DL measurements, the gNB may identify some beam/repeaters candidate for further/finer measurements. In such cases, the gNB may ask/instruct the UE to send SRS using beams it used for reception of corresponding SSB/CSI-RS.

In some cases, the gNB may ask the UE to send SRS while sweeping through a set of transmit beams. The gNB may provide a separate timing advance (TA) command, for example, as an offset to an original TA command. This separate TA command may account for the fact that the distance (and UL timing) between the UE and repeater (that is the intended target of the SRS) is different than the distance (and UL timing) between the UE and gNB This separate TA may be particularly useful in a scenario having repeaters, where the effective end-to-end round trip time (E2E RTT) may be a large number, but for local SRS measurements of the repeaters, a smaller RTT should be taken into account.

As illustrated in FIG. 13, to participate in the UL-centric sounding procedure, the gNB may configure/instruct one or multiple repeaters to perform SRS measurement and reporting.

In some cases, the gNB may consider various factors when deciding on which repeaters to select to participate in the UL-centric sounding procedure. For example, selection of repeaters may be based on DL measurements reported by the UE, UL measurements performed by the gNB (e.g., based on UL reference signals transmitted by the UE and forwarded by a repeater or repeaters). The selection of repeaters may also (additionally or alternatively) be based on a RO (RACH occasion) used by the UE to send a RACH preamble (MSG1), receive timing and power of UL transmissions by the UE, or any previous report and indication provided by the repeaters. The selection of repeaters may also be based on location information of the UE (and/or repeaters), such as the absolute location (e.g., known via GPS/positioning techniques), or relative/rough location (e.g. known via the corresponding beam directions).

Which receive beam (or beams) a repeater should use may be selected in one of a number of different ways. For example, the gNB may determine one or more receive beans for the repeater (in the manner described above for the UE Tx beams) and indicate those beams to the repeater to use for SRS measurement. In some cases, the repeater may select one or multiple beams itself (e.g., based on previous measurements).

In some cases, the receive timing of the repeater (to monitor for SRS) may be determined by the gNB (e.g., in the manner described above for the UE Tx timing) and indicate the timing to the repeater. In some cases, a repeater may determine the timing itself (e.g., based on previous measurements and/or tracking of the UE).

The repeater may be configured to measure SRS periodically, aperiodically (e.g., activated by control information, such as a DCI), or in an event-triggered manner. As an example of event-triggered, the UE may periodically send multiple SRS and the repeater may periodically measure/monitor the received power (e.g., on a beam used for receiving and forwarding UL data). If the received power falls below a threshold, the repeater may start measuring SRS).

The repeater may be configured to report SRS periodically, aperiodically, or in an event-triggered manner. As an example of event-triggered reporting, if measured RSRP on one or multiple SRS resources passes (meets or exceeds) a threshold, the repeater may send a report. In some cases, an event-triggered report could be sent in UCI, while periodic/aperiodic reports (when activated) may be sent in a media access control (MAC) control element (MAC-CE).

There are various options for the content of the report. In some cases, the report may include a single-bit. For example, the single bit may indicate if some criteria is met, such as measured reference signal received power (RSRP) on an SRS resource meets or exceeds a threshold. In some cases, the report may include additional information, such as an RX beam index, SRS resource index, and/or corresponding measured RSRP/RSSI. In some cases, a two-step reporting approach may be used. For example, upon meeting some criteria the repeater may send a minimal (e.g., single bit) report (e.g. via control information such as UCI). After the gNB receives this UCI, and if determines more info is needed, the gNB may grant resources to the repeater to provide further measurement report (e.g., via a MAC-CE). In effect, in this example, the initial UL indication acts as both a minimal report and a special SR for sending further info.

The gNB may use received SRS measurement reports from the repeater(s) to make various determinations. For example, based on the reports, the gNB may determine best beam/repeater candidate(s) for serving the UE, configure UE and/or repeaters for further/finer measurements, change and indicate the UE's serving beam, and/or change and indicate the associated repeater(s) to the UE (and hence reconfigure one or multiple repeaters to stop/start forwarding signals between the UE and the gNB).

Figure 14:
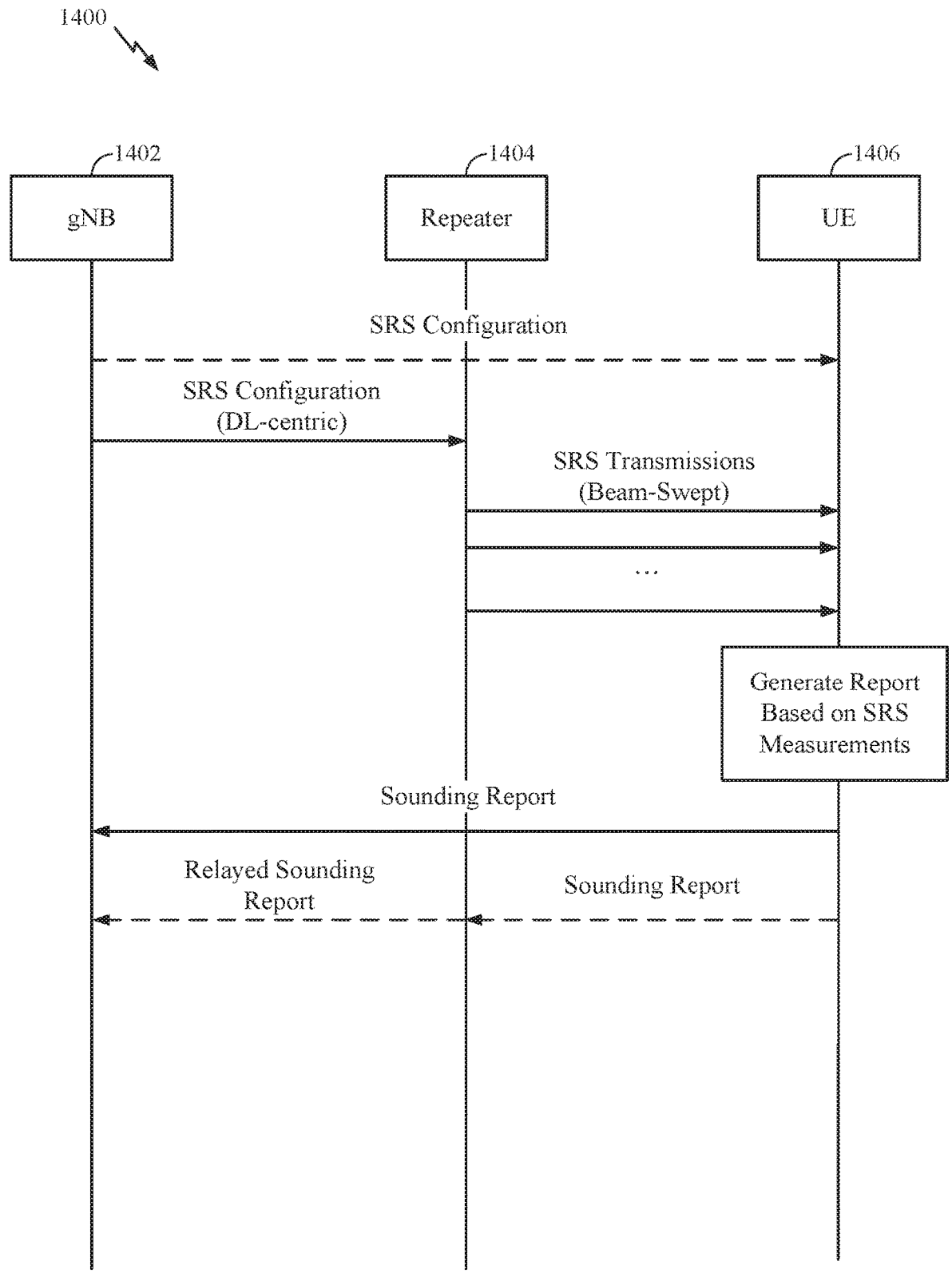
FIG. 14 is a call flow diagram illustrating example repeater configuration and operation for participation in a DL-centric sounding procedure, in accordance with certain aspects of the present disclosure.

FIG. 14 is a call flow diagram for an example DL-centric sounding procedure, in accordance with aspects of the present disclosure. As noted above, For DL-centric sounding participation, the repeater (or repeaters) send SRS, while the UE performs measurement and reporting.

As illustrated, the configuration signaling for DL-centric sounding procedure may be similar to the UL-centric sounding procedure described above. The SRS transmission, measurement, and reporting may also be technically very similar to the UL-centric sounding procedure. In this case, however, the repeater receives a configuration for transmitting SRS, while the UE is configured to measure and report. As illustrated, the UE may send a measurement report directly to a gNB. As an alternative (or in addition), the UE may send a measurement report to the repeater, to be relayed to the gNB.

Some systems may support both UL-centric and DL-centric sounding procedures, while others may support only one or the other. In either case, the UL-centric and/or DL-centric sounding procedures may be extended and applied to a multi-hop repeater network. In such cases, the same techniques described herein may be adopted for BM and association between two repeaters. In such cases, the second wireless node referred to in FIGS. 10-12 may be repeaters instead of UEs.

As described herein, directional repeaters may be configured to participate in (UL-centric and/or DL-centric) sounding procedures, such as SRS-based beam management and association procedures. Information gathered by these procedures (locally by the SRS and/or UE) may allow the selection and use of directional repeaters to be fine-tuned to provide better coverage and make more efficient use of time, frequency, and spatial resources.

Additional Considerations

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Means for receiving or means for obtaining may include a receiver (such as the receive processor 338) or an antenna(s) 334 of the access point 110 or the receive processor 358 or antenna(s) 352 of the station 120 illustrated in FIG. 3. Means for transmitting or means for outputting may include a transmitter (such as the transmit processor 320) or an antenna(s) 334 of the access point 110 or the transmit processor 364 or antenna(s) 352 of the station 120 illustrated in FIG. 3. Means for associating, means for determining, means for monitoring, means for deciding, means for providing, means for detecting, means for performing, and/or means for setting may include a processing system, which may include one or more processors, such as the receive processor 338/358, the transmit processor 320/364, the TX MIMO processor 330/366, or the controller 340/380 of the access point 110 and station 120 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a first wireless node, comprising:
    participating in at least one sounding procedure by at least one of:
        measuring a plurality of first sounding reference signal (SRS) transmissions from a third wireless node and providing a report to a second wireless node indicating a result of the measuring; or
        generating and transmitting a plurality of second sounding reference signals (SRSs) to the third wireless node,
        wherein the at least one sounding procedure comprises a beam management (BM) procedure;
    identifying, based on participating in the at least one sounding procedure, one or more beams for communications between the first wireless node and the third wireless node; and
    communicating wireless signals between the second wireless node and the third wireless node by receiving wireless signals from the second wireless node and repeating the received wireless signals to the third wireless node based on the identified one or more beams.

2. The method of claim 1, wherein:
    the wireless signals comprise RF signals; and
    the first wireless node comprises a repeater, the second wireless node comprises an access point, and the third wireless node comprises a user equipment.

3. The method of claim 1, further comprising:
    determining at least one of timing of the first SRS transmissions or which of the beams of the first wireless node to use for measuring the first SRS transmissions, wherein the measurement of the first SRS transmissions is based on the determination.

4. The method of claim 1, wherein:
    the first wireless node is configured to at least one of measure the first SRS transmissions or report the first SRS measurements periodically;
    the first wireless node is configured to measure the first SRS transmissions based on a first event; or
    the first wireless node is configured to report the first SRS measurements based on a second event.

5. The method of claim 1, wherein:
    the report indicates whether one or more criteria for a received quality metric of the first SRS transmissions are met; or
    the report indicates at least one of a receive beam index, an SRS resource index, or a measured received quality metric.

6. The method of claim 1, wherein:
    the first wireless node is configured to transmit the second SRS transmissions periodically; or
    the first wireless node is configured to transmit the second SRS transmissions based on an event that comprises at least one of an activation via a control information transmission or a received quality metric of a transmission from the third wireless node, falling below a threshold value.

7. The method of claim 1, wherein the first wireless node is further configured to forward a measurement report of the third wireless node to the second wireless node; and
    the measurement report indicates whether one or more criteria for a received quality metric of the second SRS transmissions are met; or
    the measurement report indicates at least one of a receive beam index, an SRS resource index, or a measured received quality metric.

8. The method of claim 4, wherein:
    the first event comprises at least one of an activation via a control information transmission or a received quality metric of a transmission from the third wireless node, falling below a threshold value;
    the second event comprises a received quality metric of one or more of the first SRS transmissions meets or exceeds a threshold value.

9. The method of claim 5:
    the received quality metric comprises a reference signal received power (RSRP) and the report indicates whether RSRP measured on an SRS resource meets or exceeds a threshold value; or
    further comprising receiving an indication from the second wireless node, in response to the provided report, to send a second report, wherein the second report indicates at least one of: a receive beam index, an SRS resource index, or a measured received quality metric.

10. The method of claim 1, further comprising:
    determining at least one of timing of the second SRS transmissions or which transmit beams of the first wireless node to use for sending the second SRS transmissions, wherein:
    the transmission of the second SRS is based on the determination.

11. The method of claim 1, wherein the first wireless node is configured to forward the measurement report to the second wireless node if the report indicates a received quality metric of one or more of the second SRS transmissions, as received at the third wireless node, meets or exceeds a threshold value.

12. A method for wireless communications by a third wireless node, comprising:
    configuring a first wireless node for using one or more beams to communicate signals between the third wireless node and at least one second wireless node;
    configuring the first wireless node to participate in at least one sounding procedure with the second wireless node, wherein the at least one sounding procedure comprises a beam management (BM) procedure;
    receiving a report, from at least one of the first wireless node or the second wireless node, indicating a result of the sounding procedure, the report including information identifying one or more beams for communications between the first wireless node and the third wireless node; and communicating wireless signals between the first wireless node and the third wireless node on the identified one or more beams, wherein the wireless signals comprise signals from the second wireless node repeated by the first wireless node or signals to the second wireless node repeated by the first wireless node.

13. The method of claim 12, further comprising:
selecting the first wireless node, from a set of wireless nodes, to participate in the sounding procedure, wherein the selection is based on one or more considerations; or
instructing the first wireless node to participate in at least one sounding reference signals (SRS)-based procedure with the second wireless node.

14. The method of claim 13, wherein the one or more considerations relate to at least one of:
measurements, associated with transmissions from the first wireless node, reported by the second wireless node;
measurements performed by the third wireless node based on references signals transmitted by the second wireless node and forwarded by the first wireless node;
a random access channel (RACH) occasion (RO) used by the second wireless node to send a RACH preamble;
at least one of receive timing or receive power of transmissions by the second wireless node;
prior sounding procedure related reports received from one or more of the set of wireless nodes; or
location information of at least one of the first wireless node and the second wireless node.

15. The method of claim 12, wherein:
the wireless signals comprise RF signals;
each of the first wireless node, the second wireless node and the third wireless node comprises a repeater, a user equipment or an access point; or
configuring the first wireless node to participate in the sounding procedure comprises configuring the first wireless node to measure SRS transmissions from the second wireless node and provide a second report to the third wireless node indicating a result of the measuring, wherein the reception of the report, from at least one of the first wireless node or second wireless node, comprises receiving the report from the first wireless node.

16. The method of claim 15, wherein configuring the first wireless node to participate in the sounding procedure further comprises:
providing the first wireless node an indication of at least one of timing of the SRS transmissions or which receive beams of the first wireless node to use for measuring the SRS transmissions;
configuring the first wireless node to at least one of measure the SRS transmissions or report the SRS measurements periodically;
configuring the first wireless node to measure the SRS transmissions based on a first event; or
configuring the first wireless node to report the SRS measurements based on a second event.

17. The method of claim 16, wherein:
the first event comprises at least one of an activation via a control information transmission or a received quality metric of a transmission from the second wireless node, received on a receive beam used to receive and forward RF signals between the third wireless node and the second wireless node, falling below a threshold value; or
the second event comprises a received quality metric of one or more the SRS transmissions meets or exceeds a threshold value.

18. The method of claim 15, wherein:
the second report indicates whether one or more criteria for a received quality metric of the SRS transmissions are met; or
the second report indicates at least one of: a receive beam index, an SRS resource index, or a measured received quality metric.

19. The method of claim 18, wherein:
the received quality metric comprises a reference signal received power (RSRP); and
the second report indicates whether RSRP measured on an SRS resource meets or exceeds a threshold value.

20. The method of claim 12, wherein:
configuring the first wireless node to participate in the sounding procedure comprises configuring the first wireless node to send SRS transmissions to the second wireless node; and
the reception of the report, from at least one of the first wireless node or the second wireless node, comprises receiving the report based on SRS measurements made by the second wireless node.

21. The method of claim 20, wherein:
configuring the first wireless node to send SRS transmissions to the second wireless node comprises configuring the first wireless node to send SRS transmissions by sweeping across a set of transmit beams;
the report indicates whether one or more criteria for a received quality metric of the SRS transmissions are met; or
the report indicates at least one of: a receive beam index, an SRS resource index, or a measured received quality metric.

22. The method of claim 20, wherein configuring the first wireless node to participate in the sounding procedure further comprises:
providing the first wireless node an indication of at least one of timing of the SRS transmissions or which transmit beams of the first wireless node to use for sending the SRS transmissions;
configuring the first wireless node to send the SRS transmissions periodically;
configuring the first wireless node to send the SRS transmissions based on a first event; or
configuring the first wireless node to forward a measurement report of the second wireless node to the third wireless node.

23. The method of claim 22, wherein:
the first event comprises at least one of an activation via a control information transmission or a received quality metric of a transmission from the second wireless node, received on a receive beam used to receive and forward RF signals between the third wireless node and the second wireless node, falling below a threshold value; or
the first wireless node is configured to forward the measurement report to the third wireless node if the report indicates a received quality metric of one or more of the SRS transmissions, as received at the second wireless node, meets or exceeds a threshold value.

24. A method for wireless communications by a second wireless node, comprising:
  receiving, from a third wireless node, a configuration for participating in at least one sounding procedure with a first wireless node configured to communicate signals between the third wireless node and the second wireless node;
  participating in the at least one sounding procedure with the first wireless node in accordance with the configuration, wherein the at least one sounding procedure comprises a beam management (BM) procedure;
  identifying, based on participating in the at least one sounding procedure, one or more beams for communications between the first wireless node and the third wireless node; and
  configuring one or more of the first wireless node or the third wireless node for communications between the first wireless node and the third wireless node based on the identified one or more beams, the communications comprising signaling transmitted from the second wireless node for repetition to the third wireless node or signaling received from the third wireless node for repetition to the second wireless node.

25. The method of claim 24, wherein participating in the sounding procedure comprises:
  measuring sounding reference signal (SRS) transmissions from the first wireless node; and
  providing a report to at least one of the first wireless node or the third wireless node indicating a result of the measuring.

26. The method of claim 25, wherein:
  each of the first wireless node, the second wireless node and the third wireless node comprises a repeater, a user equipment or an access point;
  the configuration indicates at least one of timing of the SRS transmissions or which of one or more beams of the second wireless node to use for measuring the SRS transmissions;
  the second wireless node is configured to at least one of measure the SRS transmissions or report the SRS measurements periodically;
  the second wireless node is configured to measure the SRS transmissions based on a first event;
  the second wireless node is configured to report the SRS measurements based on a second event;
  the report indicates whether one or more criteria for a received quality metric of the SRS transmissions are met; or
  the report indicates at least one of: a receive beam index, an SRS resource index, or a measured received quality metric.

27. The method of claim 26, wherein:
  the first event comprises at least one of an activation via a control information transmission or a received quality metric of a transmission from the first wireless node, falling below a threshold value;
  the second event comprises a received quality metric of one or more of the SRS transmissions meets or exceeds a threshold value; or
  the received quality metric comprises a reference signal received power (RSRP) and the report indicates whether RSRP measured on an SRS resource meets or exceeds a threshold value.

28. The method of claim 26, further comprising:
  receiving an indication from the third wireless node, in response to providing the report, to send a second report, wherein the second report indicates at least one of: a receive beam index, an SRS resource index, or a measured received quality metric.

29. The method of claim 24, wherein participating in the sounding procedure comprises generating and transmitting sounding reference signals (SRSs) to the first wireless node; and
  the configuration indicates at least one of timing of the SRS transmissions or which transmit beams of the second wireless node to use for transmitting the generated SRS transmissions;
  the second wireless node is configured to transmit the generated SRS transmissions periodically; or
  the second wireless node is configured to transmit the generated SRS transmissions based on an event.

30. An apparatus for wireless communications by a first wireless node, comprising:
  a memory; and
  at least one processor coupled with the memory, wherein the memory includes instructions executable by the at least one processor to cause the first wireless node to:
    participate in at least one sounding procedure by at least one of:
      measuring a plurality of first sounding reference signal (SRS) transmissions from a third wireless node and providing a report to a second wireless node indicating a result of the measuring; or
      generating and transmitting a plurality of second sounding reference signals (SRSs) to the third wireless node,
      wherein the at least one sounding procedure comprises a beam management (BM) procedure;
    identify, based on participating in the at least one sounding procedure, one or more beams for communications between the first wireless node and the third wireless node; and
    communicate wireless signals between the second wireless node and the third wireless node by receiving wireless signals from the second wireless node and repeating the received wireless signals to the third wireless node based on the identified one or more beams.

31. An apparatus for wireless communications by a third wireless node, comprising:
  a memory; and
  at least one processor coupled with the memory, wherein the memory includes instructions executable by the at least one processor to cause the third wireless node to:
    configure a first wireless node for using one or more beams to communicate signals between the third wireless node and at least one second wireless node;
    configure the first wireless node to participate in at least one sounding procedure with the second wireless node, wherein the at least one sounding procedure comprises a beam management (BM) procedure;
    receive a report, from at least one of the first wireless node or the second wireless node, indicating a result of the sounding procedure, the report including information identifying one or more beams for communications between the first wireless node and the third wireless node; and communicate wireless signals between the first wireless node and the third wireless node on the identified one or more beams, wherein the wireless signals comprise signals from the second wireless node repeated by the first wireless node or signals to the second wireless node repeated by the first wireless node.

* * * * *